United States Patent
Wende et al.

(10) Patent No.: US 12,003,201 B2
(45) Date of Patent: Jun. 4, 2024

(54) METHOD FOR CONTROLLING AN ELECTRIC MACHINE AND DRIVE SYSTEM FOR A VEHICLE

(71) Applicant: Dr. Ing. h.c. F. Porsche Aktiengesellschaft, Stuttgart (DE)

(72) Inventors: Johannes Wende, Heilbronn (DE); Robert Nelles, Stuttgart (DE); Thomas Hubert, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 526 days.

(21) Appl. No.: 17/075,823

(22) Filed: Oct. 21, 2020

(65) Prior Publication Data
US 2021/0119564 A1  Apr. 22, 2021

(30) Foreign Application Priority Data
Oct. 22, 2019 (DE) .................. 10 2019 128 473.2

(51) Int. Cl.
*H02P 25/22*  (2006.01)
*B60L 15/20*  (2006.01)
*B60W 10/08* (2006.01)
*H02P 27/08* (2006.01)

(52) U.S. Cl.
CPC .............. *H02P 27/08* (2013.01); *B60L 15/20* (2013.01); *B60W 10/08* (2013.01); *H02P 25/22* (2013.01); *B60L 2220/56* (2013.01); *B60L 2220/58* (2013.01)

(58) Field of Classification Search
CPC .......... H02J 3/388; H02J 3/00; H02J 3/28–38; H02J 3/381–385; H02J 9/062–067
See application file for complete search history.

(56) References Cited

U.S. PATENT DOCUMENTS

| | | | | |
|---|---|---|---|---|
| 6,819,078 B2* | 11/2004 | Ho | ............... | H02M 7/53873 |
| | | | | 318/808 |
| 9,979,280 B2* | 5/2018 | Adest | ............... | H02S 40/22 |
| 2008/0079401 A1* | 4/2008 | Dooley | ............... | H02K 1/2791 |
| | | | | 310/112 |

(Continued)

FOREIGN PATENT DOCUMENTS

| | | |
|---|---|---|
| CN | 106655648 A | 5/2017 |
| DE | 4315939 A1 | 11/1993 |

(Continued)

OTHER PUBLICATIONS

Chinese Office Action for Chinese Application No. 202010966445.0, dated Sep. 25, 2023 with translation, 12 pages.

(Continued)

*Primary Examiner* — Bryan R Perez
(74) *Attorney, Agent, or Firm* — BUCHANAN, INGERSOLL & ROONEY, PC

(57) ABSTRACT

A method for controlling an electric machine, in particular a permanent magnet synchronous machine, having a first, in particular three-phase, winding system, which is controlled by a first converter, and having a second, in particular three-phase, winding system, which is controlled by a second converter. The first converter is operated with block commutation and the second converter is operated with pulse width modulation, in particular space vector modulation.

13 Claims, 3 Drawing Sheets

(56) References Cited

U.S. PATENT DOCUMENTS

| | | | | |
|---|---|---|---|---|
| 2008/0246336 A1* | 10/2008 | Fishman | ................ | H05B 6/067 307/31 |
| 2014/0084736 A1* | 3/2014 | Makita | .................... | H02K 3/28 310/198 |
| 2019/0229669 A1* | 7/2019 | Yamakawa | ............. | H02P 27/06 |

FOREIGN PATENT DOCUMENTS

| | | | |
|---|---|---|---|
| DE | 102013205869 A1 | | 10/2014 |
| DE | 102016207288 A1 | | 11/2017 |
| GB | 2268343 A | | 1/1994 |
| JP | 2009023790 A | * | 2/2009 |
| JP | 2012023915 A | | 2/2012 |
| KR | 20140050974 A | | 4/2014 |
| WO | 2017186392 A1 | | 11/2017 |
| WO | 2019115350 A1 | | 6/2019 |

OTHER PUBLICATIONS

Chinese Office Action for Chinese Application No. 202010966445.0, dated Mar. 1, 2024 with English translation. (16 pages).

* cited by examiner

METHOD FOR CONTROLLING AN ELECTRIC MACHINE AND DRIVE SYSTEM FOR A VEHICLE

CROSS-REFERENCE TO RELATED APPLICATION

This application claims priority to German Patent Application No. 10 2019 128 473.2, filed Oct. 22, 2019, the content of such application being incorporated by reference herein in its entirety.

FIELD OF THE INVENTION

The invention relates to a method for controlling an electric machine, in particular a permanent magnet synchronous machine. Furthermore, the invention relates to a drive system, in particular a traction drive system, for a vehicle.

BACKGROUND OF THE INVENTION

In traction drive systems for an electric vehicle or a hybrid vehicle, permanent magnet synchronous machines are often used as electric machines. A converter is generally provided for controlling such machines, said converter providing the machine with a polyphase operating voltage. The converter is typically operated with space vector modulation (SVM). This method of operating the converter involves providing pulse-width-modulated operating voltages for the electric machine. Certain switch and on-state losses arise in the power semiconductors. Besides the fundamental voltage, the converter feed carries further high-frequency voltages. The latter result in considerable losses in the stator (iron and Joule heat losses) and in the rotor (iron and magnet losses). The continuous power of the electric machine can be restricted as a result. Additional losses result in a reduction of range in the case of electric or hybrid vehicles.

SUMMARY OF THE INVENTION

Against this background, the problem addressed is that of increasing the range of a vehicle driven by an electric machine.

In order to solve the problem, a method for controlling an electric machine is proposed, having a first, in particular three-phase, winding system, which is controlled by means of a first converter, and having a second, in particular three-phase, winding system, which is controlled by means of a second converter, wherein the first converter is operated with block commutation and the second converter is operated with pulse width modulation, in particular space vector modulation.

In the method, according to aspects of the invention, the first converter is operated with block commutation, as a result of which switching losses can be reduced. Undesired harmonics in the magnetic flux that are generated by the first converter, for example, can be compensated for in an order- or frequency-based manner by means of the second converter operated with pulse width modulation, in particular space vector modulation. Overall it thus becomes possible to increase the efficiency of the drive comprising the electric machine, such that the range of a vehicle driven by the machine can be increased.

The electric machine is preferably embodied as a permanent magnet synchronous machine.

In accordance with one advantageous configuration of the invention, provision is made for the first and second winding systems to be connected in parallel and the first converter and the second converter to be operated in phase. In this case, operation in phase is understood to mean operation in which respectively a winding of the first winding system and a winding of the second winding system are controlled in phase, wherein in particular the currents carried in said windings have the same current direction.

In accordance with an alternative advantageous configuration of the invention, provision is made for the first and second winding systems to be connected in antiparallel and the first converter and the second converter to be operated in antiphase. In this case, operation in antiphase is understood to mean operation in which respectively a winding of the first winding system and a winding of the second winding system are controlled in antiphase, wherein in particular the currents carried in said windings have opposite current directions.

One advantageous configuration provides for a clock frequency of the second converter to be set in such a way that the sum of the switching losses of the first and second converters is reduced, wherein undesired side effects, in particular noise, are preferably corrected according to defined criteria, in particular a weighting function. Alternatively or additionally, the clock frequency of the second converter is set in such a way that the harmonic losses are optimally corrected.

Also described herein is a drive system, in particular a traction drive system, for a vehicle,
    having an electric machine, in particular a permanent magnet synchronous machine, which comprises a first, in particular three-phase, winding system and a second, in particular three-phase, winding system,
    having a first converter, which is connected to the first winding system, and having a second converter, which is connected to the second winding system, and
    having a control device, which is configured to operate the first converter with block commutation and to operate the second converter with pulse width modulation, in particular space vector modulation.

The same advantages as have already been described in association with the method for controlling an electric machine can be achieved in the case of the drive system.

Preferably, the second converter comprises semiconductor switches having a higher maximum possible switching frequency than the first converter. As a result, semiconductor switches having higher switching losses can be used in the first converter and the material costs for the first converter can be reduced. Particularly preferably, the second converter comprises SiC or GaN semiconductor switches, for example SiC MOSFETs or GaN FETs. The first converter can comprise Si semiconductor switches, for example Si IGBTs.

In accordance with one advantageous configuration, provision is made for the drive system to comprise a common link circuit, in particular having a common link circuit capacitor, which is connected to the first converter and the second converter. A compact and cost-effective configuration of the drive system is made possible as a result.

A further configuration of the invention provides for the electric machine to comprise a stator having a plurality of slots, wherein at least a first phase conductor of the first winding system and a second phase conductor of the second winding system are arranged in each of the slots.

In this context, it is preferred for a plurality of radial positions for arranging phase conductors to be provided in the slots, wherein the first phase conductor is arranged in a different radial position in a first slot than in a second slot. Particularly preferably, the first phase conductor is arranged in all the radial positions.

Also described herein is a vehicle, in particular an electric vehicle or a hybrid vehicle, having a drive system described above. The same advantages as have already been described in association with the method for controlling an electric machine and the drive system can be achieved in the case of the vehicle.

BRIEF DESCRIPTION OF THE DRAWING FIGURES

Further details and advantages of the invention will be explained on the basis of the exemplary embodiments shown in the drawings, in which.

DETAILED DESCRIPTION OF THE INVENTION

Figure 1:
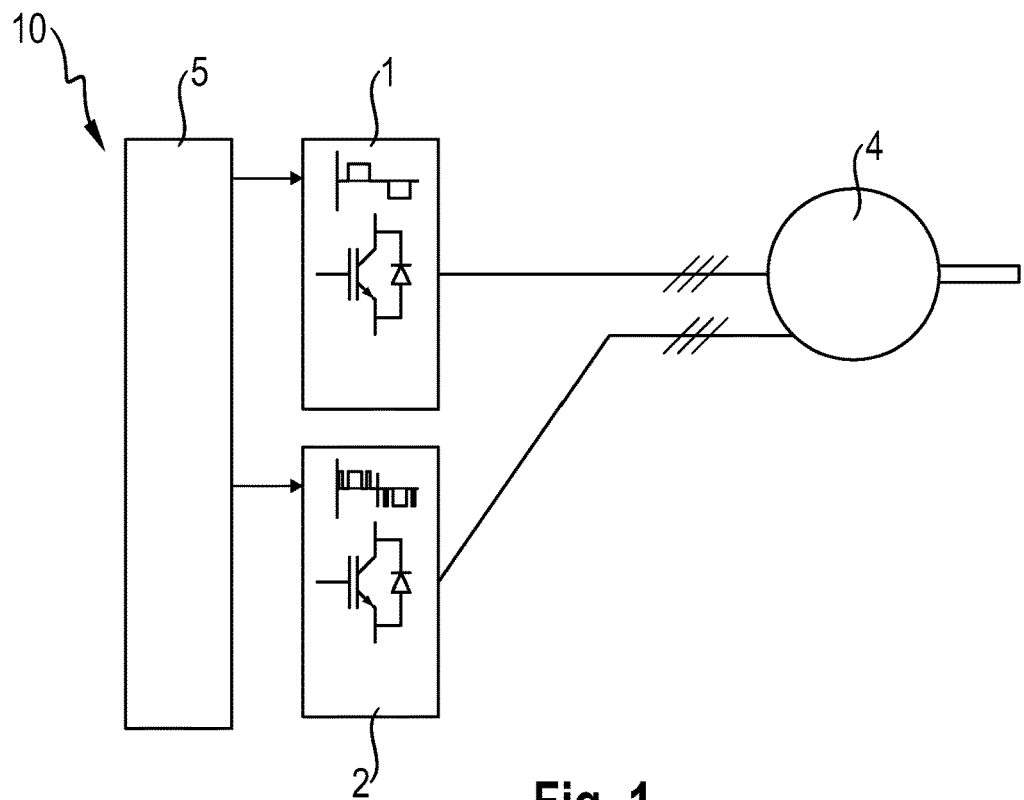
FIG. 1 shows a drive system in accordance with a first exemplary embodiment of the invention in a schematic block diagram.

FIG. 1 illustrates a drive system 10, which is embodied as a traction drive system for a vehicle and which comprises an electric machine 4 embodied as a permanent magnet synchronous machine. The electric machine 4 is fed by two separate, in each case three-phase, winding systems. In this respect, the electric machine 4 comprises a first three-phase winding system and a second three-phase winding system.

As further constituents of the drive system 10, a first converter 1 and a second converter 2 are provided, which are controlled by way of a control device 5 of the drive system 10. The first converter 1 is connected to the first winding system and the second converter 2 is connected to the second winding system. In order to reduce the switching losses of the converter 1 and thus to increase the range of the vehicle driven by the electric machine 4, the control device 5 is configured to operate the first converter 1 with block commutation and to operate the second converter 2 with pulse width modulation, in particular space vector modulation.

The first converter 1 comprises semiconductor switches, the maximum switching frequency of which is lower than the semiconductor switches of the second converter 2. Therefore, semiconductor switches used in the first converter 1 can have significantly lower costs than those used in the second converter 2. By way of example, the semiconductor switches of the first converter are embodied as Si semiconductor switches and the semiconductor switches of the second converter are embodied as SiC or GaN semiconductor switches.

During the operation of the drive system, the second converter is operated by the control unit with a clock frequency, such that, depending on the operating point, the sum of the switching losses becomes minimal and at the same time low-frequency harmonics in the magnetic flux that are generated by the first converter are compensated for. In this case, the clock frequencies of the second converter 2 are variable by way of the set of operating point characteristics.

Figure 2:
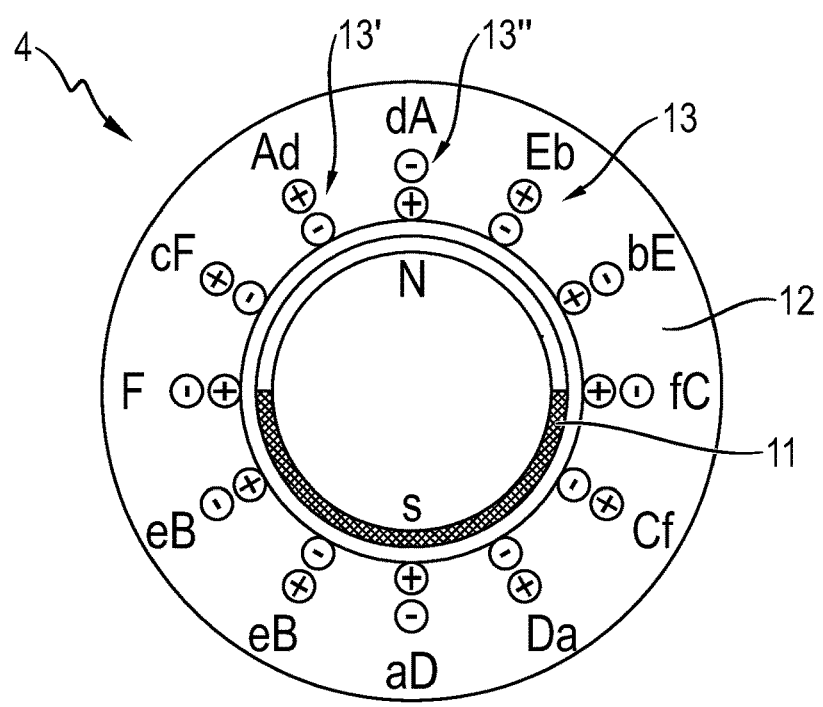
FIG. 2 shows the electric machine of the drive system according to FIG. 1 in a schematic sectional illustration.

The illustration in FIG. 2 shows the electric machine 4 of the drive system 10 from FIG. 1 in accordance with the first exemplary embodiment. The electric machine 4 comprises a rotor 11 having a permanent magnet, which comprises a north pole N and a south pole S. The electric machine 4 furthermore comprises a stator 12 having a plurality of slots 13, here exactly twelve slots. The slots 13 each have two radial positions in which phase conductors of the winding systems are arranged. The phase conductors are designated by the reference signs a-f and A-F, where upper-case letters denote a first end of a phase conductor and lower-case letters denote a second end of a phase conductor, opposite to the first end. The phase conductors a-c and respectively A-C are the phase conductors of the first winding system and the phase conductors d-f and respectively D-F are the phase conductors of the second winding system.

In the case of the electric machine 4 shown in FIG. 2, a first phase conductor a and respectively A is arranged in a different radial position in a first slot 13' than in a second slot 13". The first phase conductor a and respectively A is thus arranged in all the radial positions provided by the slots of the stator 12. Furthermore, the other phase conductors b-f and respectively B-F are arranged in the slots 13 in such a way that at least a first phase conductor a-c and respectively A-C of the first winding system and a second phase conductor d-f and respectively D-F of the second winding system are arranged in each of the slots 13.

Figure 3:
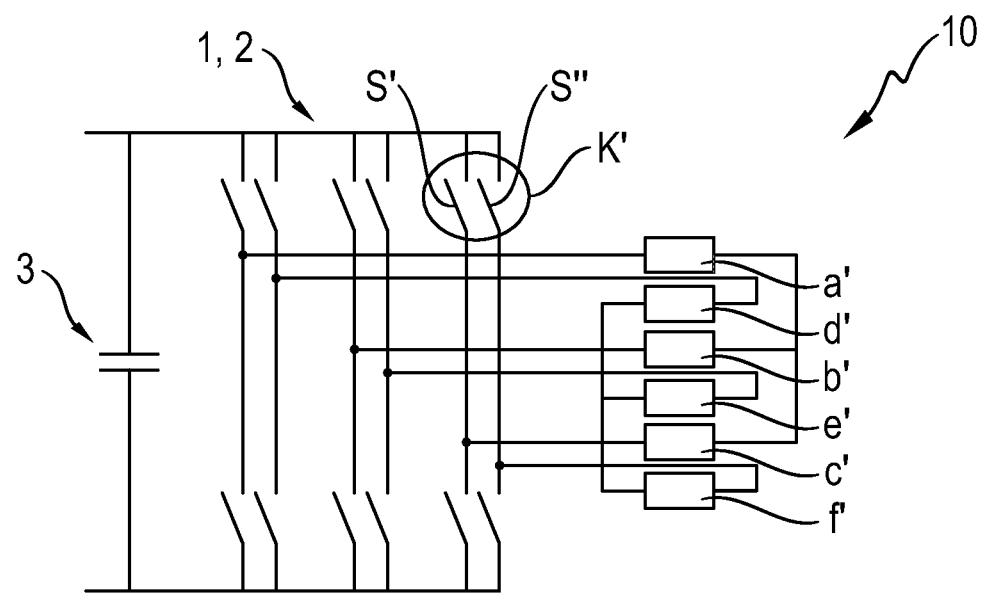
FIG. 3 shows a drive system in accordance with a second exemplary embodiment of the invention in a schematic circuit diagram.

FIG. 3 illustrates a second exemplary embodiment of a drive system 10 according to aspects of the invention in a circuit diagram, wherein the semiconductor switches of the first converter 1 are illustrated alongside the semiconductor switches of the second converter 2. In the circle K, by way of example, a semiconductor switch S' of the first converter 1 is shown alongside a semiconductor switch S" of the second converter 2. The phase conductors of the two winding systems are designated by the reference signs a'-f'. In the case of the drive system 10 according to FIG. 3, the first winding system a', b', c' and the second winding system d', e', f are connected in antiparallel. The first converter 1 and the second converter 2 are operated in antiphase. The switches S' and S" have different switching states. As a result, e.g. the phase conductors a' and d' of the two winding systems are controlled in antiphase, such that currents having opposite current directions flow in said phase conductors a' and d'. A magnetic flux in the same direction is generated as a result of the antiparallel interconnection.

The two converter 1, 2 are connected to a common link circuit 3, in particular having a common link circuit capacitor.

Figure 4:
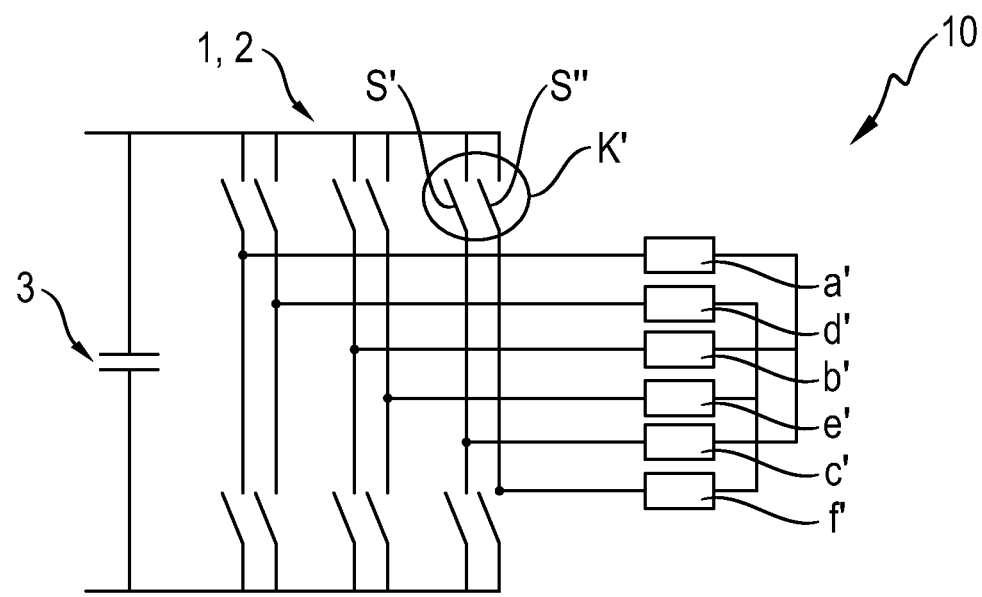
FIG. 4 shows a drive system in accordance with a third exemplary embodiment of the invention in a schematic circuit diagram.

FIG. 4 illustrates a third exemplary embodiment of a drive system 10 according to aspects of the invention in a circuit diagram. The third drive system 10 in accordance with the third exemplary embodiment substantially corresponds to that of the second exemplary embodiment, but the first winding system a', b', c' and the second winding system d', e', f are connected in parallel and the first converter 1 and the second converter 2 are operated in phase. The switches S' and S" have identical switching states.

Figure 5:
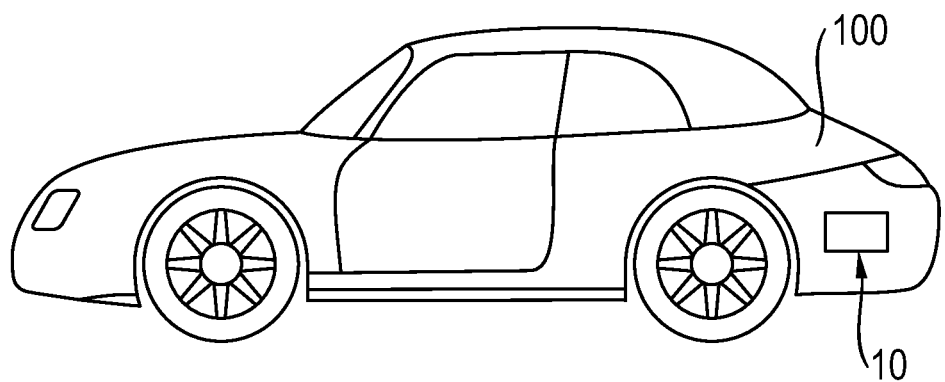
FIG. 5 shows one exemplary embodiment of a vehicle according to aspects of the invention in a schematic illustration.

The illustration in FIG. 5 shows a vehicle 100 having a drive system 10, which can be configured in accordance with one of the exemplary embodiments described above. The vehicle 100 can be an electric vehicle or a hybrid vehicle. The drive system 10 can be provided such that wheels of a front axle or wheels of a rear axle or wheels of both a front axle and a rear axle are drivable by the drive system. As a further alternative, it is possible for exactly one wheel to be drivable by the drive system.

In accordance with one modification of the exemplary embodiments described above, the pole pair number of the electric machine 4 can be greater than 1, wherein the rotor comprises in particular a plurality of south poles S and north poles N. By way of example, a plurality of permanent magnets can be arranged on the rotor.

A further modification of the exemplary embodiments described above provides for the pole pair number to be 1, the rotor 11 to comprise six slots and the hole number to be 1, wherein the hole number denotes the number of slots per pole number and winding section.

A further modification provides for the pole pair number to be 1 and the rotor 11 to comprise twelve slots.

What is claimed:

1. A traction drive system for a vehicle comprising:
a permanent magnet synchronous electric machine including a first winding system and a second winding system,
a first converter connected to the first winding system,
a second converter connected to the second winding system, and
a control device configured to (i) operate the first converter with block commutation and (ii) operate the second converter with pulse width modulation,
wherein the electric machine comprises a stator having a plurality of slots, each slot having two radial positions in which phase conductors of the first winding system and the second winding system are arranged,
wherein a first phase conductor of the first winding system is arranged in a different radial position in a first slot than in a second slot, and wherein the first winding system and the second winding system are connected in antiparallel, and
wherein the first converter and the second converter comprise different semiconductor switches and the semiconductor switches have different switching states.

2. A traction drive system for a vehicle comprising:
a permanent magnet synchronous electric machine including a first winding system and a second winding system,
a first converter connected to the first winding system,
a second converter connected to the second winding system, and
a control device configured to (i) operate the first converter with block commutation and (ii) operate the second converter with pulse width modulation,
wherein the electric machine comprises a stator having a plurality of slots, each slot having two radial positions in which phase conductors of the first winding system and the second winding system are arranged,
wherein a first phase conductor of the first winding system is arranged in a different radial position in a first slot than in a second slot, wherein the first converter and the second converter are operated in phase, and
wherein the first converter and the second converter comprise different semiconductor switches and the semiconductor switches have identical switching states.

3. A traction drive system for a vehicle comprising:
a permanent magnet synchronous electric machine including a first winding system and a second winding system,
a first converter connected to the first winding system,
a second converter connected to the second winding system, and
a control device configured to (i) operate the first converter with block commutation and (ii) operate the second converter with pulse width modulation,
wherein the electric machine comprises a stator having a plurality of slots, each slot having two radial positions in which phase conductors of the first winding system and the second winding system are arranged,
wherein a first phase conductor of the first winding system is arranged in a different radial position in a first slot than in a second slot,
wherein the first winding system and the second winding system are connected in antiparallel, and
wherein the first phase conductor of the first winding system and a second phase conductor of the second winding system are controlled in antiphase, such that currents having opposite current directions flow in the first phase conductor and the second phase conductor.

4. The drive system as claimed in claim 3, wherein the pulse width modulation is space vector modulation.

5. The drive system as claimed in claim 3, wherein each winding system is a three-phase winding system.

6. The drive system as claimed in claim 3, wherein a common link circuit, having a common link circuit capacitor, is connected to the first converter and the second converter.

7. A electric vehicle or a hybrid vehicle having the drive system as claimed in claim 3.

8. The drive system as claimed in claim 3, wherein the first winding system and the second winding system are connected in parallel.

9. The drive system as claimed in claim 3, wherein the first converter and the second converter are operated in antiphase.

10. The drive system as claimed in claim 3, wherein the first converter and the second converter comprise different semiconductor switches, wherein the semiconductor switches of the second converter have a higher maximum switching frequency than the semiconductor switches of the first converter.

11. The drive system as claimed in claim 10, wherein the semiconductor switches of the second converter comprise Silicon Carbide ("SiC") metal-oxide-semiconductor field-effect transistors ("MOSFETs") or gallium nitride ("GaN") field-effect transistors ("FETs"), and wherein the semiconductor switches of the first converter comprise silicon-insulated-gate bipolar transistors ("Si IGBTs").

12. The drive system as claimed in claim 3, wherein at least a first phase conductor of the first winding system and a second phase conductor of the second winding system are arranged in each of the slots.

13. The drive system as claimed in claim 12, wherein the first phase conductor is arranged in all the radial positions.

* * * * *